United States Patent
Mathew (10) Patent No.: US 11,159,434 B2
(45) Date of Patent: Oct. 26, 2021

(54) ADAPTIVE RATE LIMITING OF FLOW PROBES

(71) Applicant: VMWARE, INC., Palo Alto, CA (US)

(72) Inventor: George Mathew, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 141 days.

(21) Appl. No.: 16/679,354

(22) Filed: Nov. 11, 2019

(65) Prior Publication Data

US 2021/0058330 A1 Feb. 25, 2021

(30) Foreign Application Priority Data

Aug. 23, 2019 (IN) .............................. 201941033979

(51) Int. Cl.
| | |
|---|---|
| *H04L 12/26* | (2006.01) |
| *H04L 12/825* | (2013.01) |
| *G06F 9/455* | (2018.01) |
| *H04L 29/06* | (2006.01) |

(52) U.S. Cl.
CPC .......... *H04L 47/25* (2013.01); *G06F 9/45558* (2013.01); *H04L 43/0882* (2013.01); *H04L 43/10* (2013.01); *H04L 43/16* (2013.01); *G06F 2009/45595* (2013.01); *H04L 63/1425* (2013.01)

(58) Field of Classification Search
CPC ..... H04L 43/10; H04L 43/16; H04L 63/1408; H04L 63/1425
See application file for complete search history.

(56) References Cited

U.S. PATENT DOCUMENTS

| | | | |
|---|---|---|---|
| 2006/0288413 A1* | 12/2006 | Kubota | H04L 63/1458 726/23 |
| 2018/0027404 A1* | 1/2018 | Delos Reyes | H04L 43/106 455/456.5 |
| 2018/0089014 A1* | 3/2018 | Smith | H04L 43/0805 |
| 2019/0363965 A1* | 11/2019 | Tewari | H04L 43/0841 |

* cited by examiner

*Primary Examiner* — Hoon J Chung
(74) *Attorney, Agent, or Firm* — Adeli LLP (57) ABSTRACT

A technique for performing adaptive rate limiting of flow probes is described. The technique includes sending a plurality of flow probes from a first service engine to at least one other service engine. The flow probes are sent at a rate that does not exceed a rate limit. A flow probe of the plurality of flow probes is generated in response to the first service engine receiving a mid-flow packet for a flow that is not recognized by the first service engine. A recipient service engine of the flow probe responds with a success indicator if the recipient service engine recognizes the flow. The technique also includes determining a success rate associated with success indicators received from the at least one other service engine and comparing the success rate with a first threshold. The rate limit is adjusted in response to a comparison result.

23 Claims, 4 Drawing Sheets

ADAPTIVE RATE LIMITING OF FLOW PROBES

RELATED APPLICATIONS

Benefit is claimed under 35 U.S.C. 119(a)-(d) to Foreign Application Serial No. 201941033979 filed in India entitled "ADAPTIVE RATE LIMITING OF FLOW PROBES", on Aug. 23, 2019, by VMWARE, INC., which is herein incorporated in its entirety by reference for all purposes.

BACKGROUND

Computer networks are increasingly used to provide access to software applications. In large-scale networks such as data centers and enterprise networks, high volumes of traffic can be transmitted and received. To accommodate a large volume of traffic, the traffic for an application may be routed through and processed by multiple virtual machines and/or servers. To facilitate this flow of traffic through the network, connections between network components are established. For example, a connection between a client and a server may be established to allow the client to communicate with and utilize services provided by the server. This communication is via a flow of packets corresponding to the connection. Once the connection is created, mid-flow packets for the flow are sent through the network between the components.

Mid-flow packets not recognized as part of a previously established flow may be received by a component. Such mid-flow packets may be sent by an attacker. In conventional systems, the maximum rate at which responses to receipt of such mid-flow packets are allowed to be sent is limited to protect against failures due to such attacks. In other instances, reception of mid-flow packets from an unrecognized flow can be part of accepted operation of the network. For example, a resetting of a network component and/or addition of additional network components may result in mid-flow packets from an unrecognized flow being received by a component. In such instances, constraining the rate at which responses to receipt of mid-flow packets for an unrecognized flow are sent may result in dropped connections or other undesirable behavior. Consequently, a mechanism for ensuring the security of large-scale networks against attack, while allowing the network to adapt to changes in operation of the network is desired.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique for performing adaptive rate limiting of flow probes is described. The technique includes sending flow probes from a first service engine to other service engine(s). The flow probes are sent at a rate that does not exceed a rate limit. A flow probe is generated in response to the first service engine receiving a mid-flow packet for a flow that is not recognized by the first service engine. A recipient service engine of the flow probe responds with a success indicator if the recipient service engine recognizes the flow. The technique also includes determining a success rate associated with success indicators received from the other service engine(s) and comparing the success rate with a first threshold. The rate limit is adjusted in response to a result of the comparison.

Figure 1:
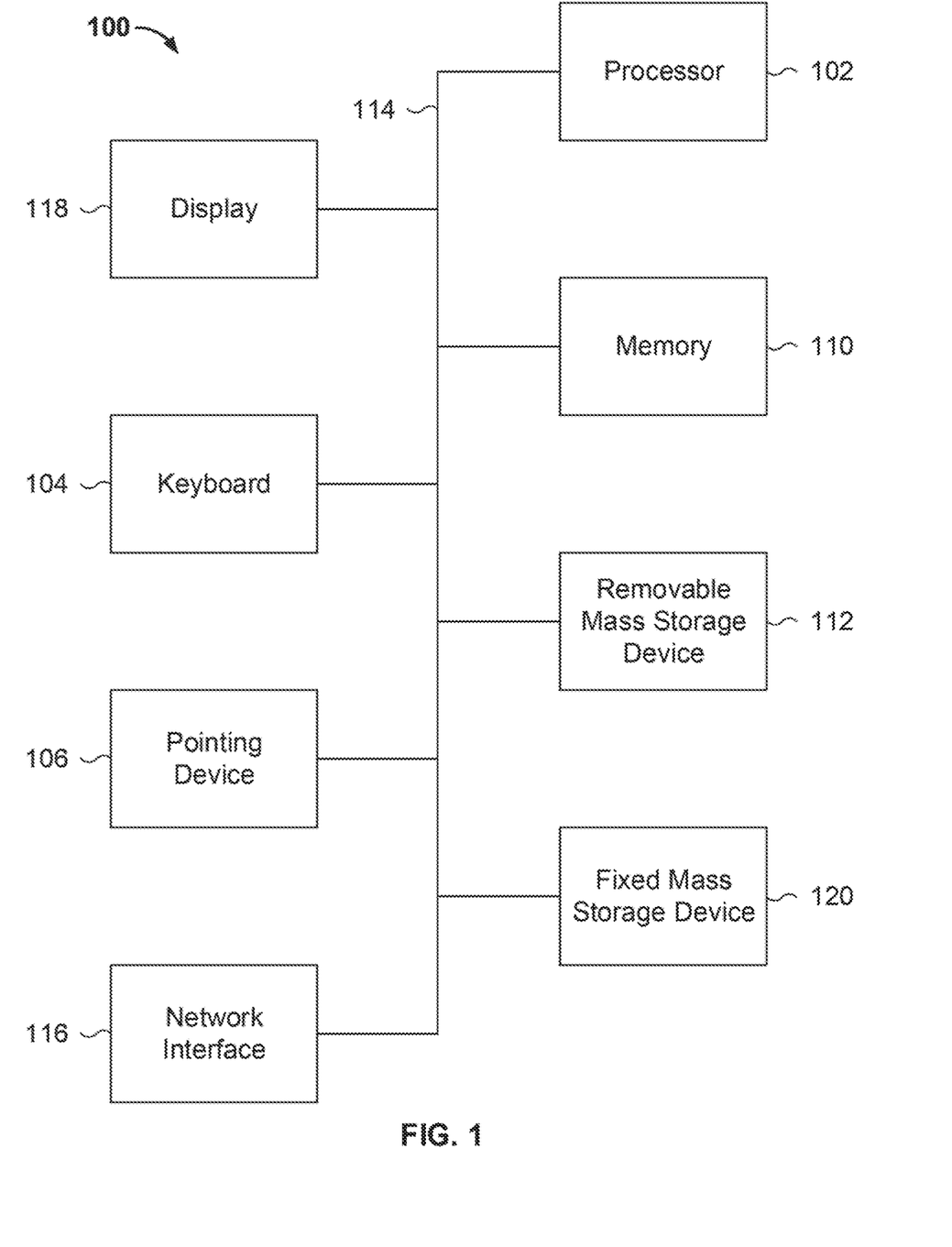
FIG. 1 is a functional diagram illustrating a programmed computer system for providing an adaptive flow in accordance with some embodiments.

FIG. 1 is a functional diagram illustrating a programmed computer system for performing adaptive rate limiting of flow probes in accordance with some embodiments. As will be apparent, other computer system architectures and configurations can be used to collect custom metrics. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide functions described below with respect to server 202, etc. of FIG. 2.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storages 112, 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary 110 device interface (not shown) can be used in conjunction with computer system 100. The auxiliary 110 device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
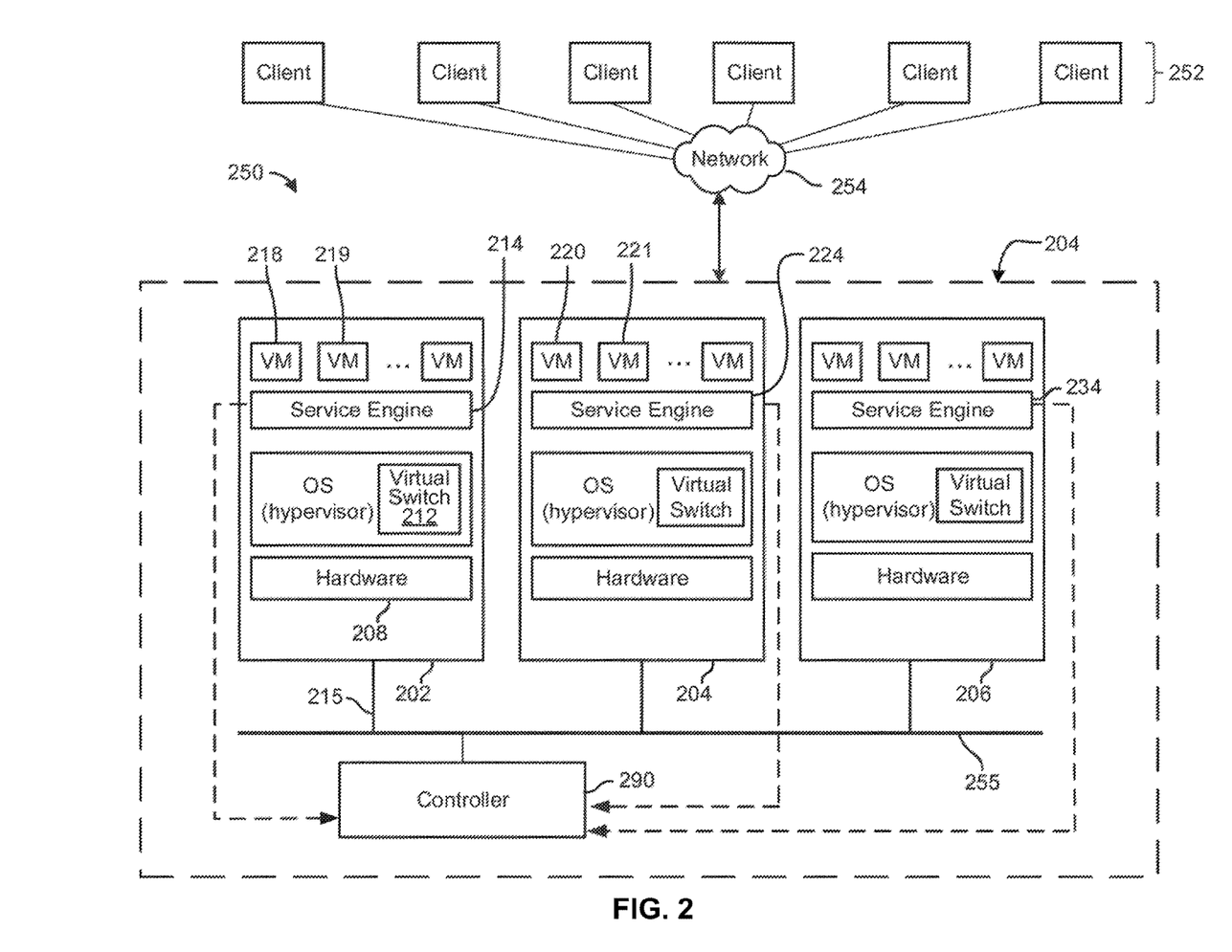
FIG. 2 is a block diagram illustrating an embodiment of a system including a distributed network service platform that provides adaptive rate limiting of flow probes.

FIG. 2 is a block diagram illustrating an embodiment of a system that includes a distributed network service platform and may perform adaptive rate limiting of flow probes. In this example, client devices such as 252 connect to a system 250 via a network 254. In some embodiments, system 250 is a data center. A client device can be a laptop computer, a desktop computer, a tablet, a mobile device, a smart phone, a wearable networking device, or any other appropriate computing device. In some embodiments, a web browser and/or a standalone client application is installed at each client, enabling a user to use the client device to access certain applications hosted by system 250. Network 254 can be the Internet, a private network, a hybrid network, or any other communications network.

In the example shown, a networking layer 255 comprising networking devices such as routers, switches, etc. forwards requests from client devices 252 to a distributed network service platform 204. In this example, distributed network service platform 204 includes a number of servers configured to provide a distributed network service. A physical server (e.g., 202, 204, 206, etc.) has hardware components and software components, and can be implemented using a device such as 100. In this example, hardware (e.g., 208) of the server supports operating system software in which a number of virtual machines (VMs) (e.g., 218, 219, 220, etc.) are configured to execute. A VM is a software implementation of a machine (e.g., a computer) that simulates the way a physical machine executes programs. The part of the server's operating system that manages the VMs is referred to as the hypervisor. The hypervisor interfaces between the physical hardware and the VMs, providing a layer of abstraction to the VMs. Through its management of the VMs' sharing of the physical hardware resources, the hypervisor makes it appear as though each VM were running on its own dedicated hardware. Examples of hypervisors include the VMware vSphere® Hypervisor and KVM. Although physical servers supporting VM architecture are shown and discussed extensively for purposes of example, physical servers supporting other architectures such as container-based architecture (e.g., Kubernetes®, Docker®, Mesos®), standard operating systems, etc., can also be used and techniques described herein are also applicable. In a container-based architecture, for example, the applications are executed in special containers rather than virtual machines.

In some embodiments, instances of applications are configured to execute on the VMs. In some embodiments, a single application corresponds to a single virtual service. Examples of such virtual services include web applications such as shopping cart, user authentication, credit card authentication, email, file sharing, virtual desktops, voice/video streaming, online collaboration, and many others. In some embodiments, a set of applications is collectively referred to as a virtual service. For example, a web merchant can offer shopping cart, user authentication, credit card authentication, product recommendation, and a variety of other applications in a virtual service. Multiple instances of the same virtual service can be instantiated on different devices. For example, the same shopping virtual service can be instantiated on VM 218 and VM 220. The actual distribution of the virtual services depends on system configuration, run-time conditions, etc. Running multiple instances of the virtual service on separate VMs provide better reliability and more efficient use of system resources.

One or more service engines (e.g., 214, 224, 234 etc.) are instantiated on a physical device. In some embodiments, a service engine is implemented as software executing in a virtual machine. The service engine is executed to provide distributed network services for applications executing on the same physical server as the service engine, and/or for applications executing on different physical servers. In some embodiments, the service engine is configured to enable appropriate service components. For example, a load balancer component is executed to provide load balancing logic to distribute traffic load amongst instances of applications executing on the local physical device as well as other physical devices; a firewall component is executed to provide firewall logic to instances of the applications on various devices; a metrics agent component is executed to gather metrics associated with traffic, performance, etc. associated with the instances of the applications, etc. Many other service components may be implemented and enabled as appropriate. When a specific service is desired, a corresponding service component is configured and invoked by the service engine to execute in a VM.

In the example shown, traffic received on a physical port of a server (e.g., a communications interface such as Ethernet port 215) is sent to a virtual switch (e.g., 212). In some embodiments, the virtual switch is configured, using an API provided by the hypervisor, to intercept incoming traffic designated for the application(s) in an inline mode and send the traffic to an appropriate service engine. In inline mode, packets are forwarded on without being replicated. As shown, the virtual switch passes the traffic to a service engine in the distributed network service layer (e.g., service engine 214 on the same physical device), which may drop packets, transform packets if needed, and redirect packets to the appropriate application. The service engine, based on factors such as configured rules and operating conditions, may redirect traffic to an appropriate application executing in a VM on a server.

Controller 290 is configured to control, monitor, program, and/or provision the distributed network services and virtual machines. For example, controller 290 may be monitor traffic through the network and determine whether to add to or reduce a number of service engines. The controller can be implemented as software, hardware, firmware, or any combination thereof. In some embodiments, the controller is implemented on a system such as 100. In some cases, the controller is implemented as a single entity logically, but multiple instances of the controller are installed and executed on multiple physical devices to provide high availability and increased capacity. In embodiments implementing multiple controllers, known techniques such as those used in distributed databases are applied to synchronize and maintain coherency of data among the controller instances.

The components and arrangement of distributed network service platform 204 described above are for purposes of illustration only. The technique described herein is applicable to network service platforms having different components and/or arrangements.

In network service platform 204, multiple service engines 214, 224 and 234 may be used to provide the same virtual service. For example, service engines 214, 224 and 234 may all be used in providing load balancing services. Such a virtual service is considered to be scaled out to multiple service engines 214, 224 and 234. The service engines 214, 224 and 234 providing the virtual service are termed a scale out set for the virtual service. Each service engine 214, 224 and 234 manages a flow of packets (e.g. communications including data and/or other information) for the virtual service. Although service engines 214, 224 and 234 do not synchronize their flows, each service engine maintains the identity of the remaining service engines in the scale out set.

Each of the service engines 214, 224 and 234 in a scale out set receives packets for flows for the virtual service. To do so, a connection and corresponding flow are established. In such embodiments, a particular client 252 requesting the virtual service handshakes with one of the service engines in the scale out set, such as service engine 214. Handshaking provides the identities of service engine 214, the virtual service and client 252 and the protocols for communication. Handshaking can occur via a synchronization packet for the virtual service sent from client 252 through network 254 and routed to service engine 214 by network layer 255. Service engine 214 provides the appropriate response to the client's synchronization packet. Communication between service engine 214 and client 252 thus proceeds until the requisite information is exchanged and the connection established. Once handshaking is completed, client 252 sends mid-flow packets (e.g. packets not used for handshaking, such as packets with content data), which are routed via network layer 255 to the corresponding service engine 214. Because of the handshaking, the mid-flow packets are recognized as part of the already established flow for the virtual service and are serviced by service engine 214. To service the mid-flow packets, a binding between service engine 214 and the corresponding virtual service may be utilized. Such a binding ensures that packets received by service engine 214 through the connection are sent on to the virtual service. Thus, service engine 214 receives mid-flow packets from client 252 that are part of the flow and sends these mid-flow packets to the corresponding virtual service.

For example, a particular client 252 requesting the virtual service may send a TCP SYN packet through network 254 to network layer 255. Network layer 255 routes the TCP SYN packet to a service engine that is part of the scale out set for the virtual service, such as service engine 214. Service engine 214 performs TCP handshaking with the client 252 sending the TCP SYN packet. More specifically, service engine 214 responds to client 252 with an acknowledgement packet, known as a TCP SYN-ACK packet. Upon receiving the TCP SYN-ACK packet, client 252 replies to service engine 214 with a TCP ACK packet, another acknowledgment packet. This process completes the handshaking. Following successful completion of handshaking, a connection between the client 252 and service engine 214 for the virtual service is established. The established connection, or flow, may be identified by the combination of the IP address of client 252, port number for client 252, IP address of the virtual service being requested, port number of the virtual service being requested and protocol used. In other embodiments, another mechanism for identifying the flows might be employed. A binding has also been established between service engine 214 that is part of the scale out set and the corresponding virtual service. Thus, packets received from client 252 that are part of the flow are sent by service engine 214 to the corresponding virtual service.

Service engine 214 may then service a flow for client 252 utilizing the virtual service. In particular, client 252 may send mid-flow packets (e.g. TCP packets with no SYN flag set), which are routed via network layer 255 to the appropriate service engine 214, recognized by the service engine 214 and sent to the appropriate virtual service. Service engine 214 recognizes mid-flow packets based on the identifiers indicated above that are in the header of each mid-flow packet. For example, service engine 214 may maintain a flow table including entries for each connection. The entries store the IP address and port number for each client 252 and IP address and port number for the virtual service corresponding to each connection. Using the information in the mid-flow packet header, service engine 214 consults the flow table to match the mid-flow packet's identifying information to the corresponding flow. Once the flow for the mid-flow packet is identified, the mid-flow packet is sent by service engine 214 to the corresponding virtual service. Mid-flow packets received by service engine 214 from the virtual service are sent to client 252 via the same connection.

Service engines 214, 224 and 234 in the scale out set may receive mid-flow packets that are not recognized as corresponding to a known flow for the service engine. Stated differently, mid-flow packets that are not recognized as belonging to a particular connection that has been established can be received at a service engine. Such a packet may be a malicious packet sent as an attack on system 250. Alternatively, such a packet may be part of normal operation of system 250, for example received by the service engine due to changes in the system. In some embodiments, a configuration change, such as a change in the scale out set, may result in mid-flow packets being sent. For example, if an additional service engine is added to the scale out set to account for high loads in system 250, network layer 256 may route mid-flow packets for an existing flow to the added service engine. In some embodiments, other flows may also be redistributed between service engines already part of the scale out set. Thus, one or more service engines may receive mid-flow packets from an unrecognized flow. As another example, if one of the service engines is removed from the scale out set, mid-flow packets for an existing flow that was serviced by the removed service engine can be redirected to one or more remaining service engines. Similarly, if portions of a router in network layer 256 are reset, information related to routing of packets for a flow may be lost. In such cases, the router in network layer 256 may send mid-flow packets for a flow to a different service engine in the scale out set. In some embodiments, other flows may also be redistributed between the service engines in response to removal of a service engine or the router being reset. Thus, one or more service engines may receive mid-flow packets from an unrecognized flow.

In this example, system 250 is configured to facilitate the handling of unrecognized mid-flow packets by performing adaptive rate limiting of flow probes. Service engines 214, 224 and 234 send out flow probes in response to receiving a mid-flow packet for an unrecognized flow. Such flow probes identify the unrecognized flow, for example using the IP addresses and port numbers described above, and request a reply if the flow is recognized. Such flow probes are used to determine whether other service engines in system 250 recognize the flow. The rate at which such flow probes are sent is capped by a rate limit. If the mid-flow packet for an unrecognized flow is likely to be for a flow recognized by another service engine, the rate limit is increased. If, however, the mid-flow packet for an unrecognized flow is less likely to be for a flow recognized by another service engine, and thus may be an attack, the rate limit is decreased. Consequently, the manner in which flow probes are limited is adapted, allowing for improved performance of distributed services platform.

Figure 3:
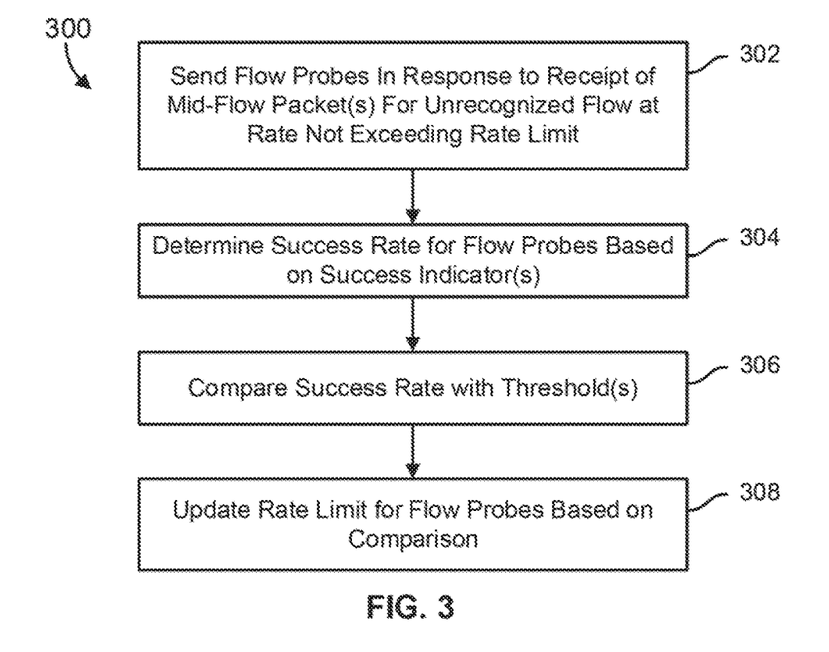
FIG. 3 is flow chart depicting an embodiment of a method for providing adaptive rate limiting for flow probes.

FIG. 3 depicts a flow chart of an embodiment of a process 300 for performing adaptive rate limiting of flow probes. Method 300 may be considered to provide a process for a service engine to adaptively respond to the receipt of one or more mid-flow packets associated with an unrecognized flow. The unrecognized flow is a flow for which the service engine does not have a corresponding connection. In some embodiments, the service engine receiving the mid-flow packets is part of a scale out set for a virtual service. Thus, the unrecognized flow may be used by a client in accessing the virtual service. Method 300 is described in the context of processes having a particular order. However, the processes may include sub-processes and may be performed in another order including but not limited to in parallel. Method 300 is also described in the context of particular thresholds and certain mechanisms for changing the rate limit. In other embodiments, other thresholds and/or other mechanisms for changing the rate limit may be used.

Flow probes are sent from a service engine to at least one other service engine, at 302. The flow probes are generated and sent in response to the service engine receiving a mid-flow packet for a flow that is not recognized by the service engine (i.e. an unrecognized flow). The flow probes query other service engine(s) to determine whether the other service engine(s) recognize the flow corresponding to the mid-flow packet. In some embodiments, the flow probes take the form of messages including identifying information for the flow and asking if the other service engine(s) handle the unrecognized flow. In some embodiments, special headers or variable fields are specified for this purpose. In some embodiments, the service engine sends the flow probes only to other service engine(s) in the scale out set for the virtual service corresponding to the unrecognized flow. Stated differently, all service engines receiving the flow probes are part of the scale out set. In some embodiments, the flow probes may be sent to a different and/or larger set of service engines. For example, in some embodiments, flow probes are sent to all service engines.

Also at 302, the flow probes are sent at a rate that does not exceed a rate limit. In some embodiments, the rate limit is set based upon conditions existing around the time of receipt of the mid-flow packet. For example, if a configuration change has been detected, the rate limit may be initially set higher than if no configuration change is detected. This difference is because the existence of the configuration change provides a possible reason for such mid-flow packets to be received. Therefore allowing a higher rate limit would allow more mid-flow packets to be processed and may result in fewer dropped connections. If no configuration change is detected then there is a greater probability that the mid-flow packet is part of an attack, and limiting the number of flow probes to a lower rate would prevent the service engine from dropping benign packets or connections because it is too busy processing flow probes generated in response to the receipt of malicious packets.

A service engine receiving a flow probe ("recipient service engine") responds with a success indicator in the event that the recipient service engine recognizes the flow. In some embodiments, any response received by the service engine from a recipient service engine constitutes a success indicator. Thus, a recipient service engine only replies with a response to the flow probe if the flow is recognized. In some embodiments, this response takes the form of a message indicating the recipient service engine recognizes the flow. In other embodiments, the recipient service engine sets a flag in the response or otherwise configures the response to provide the success indicator if the flow is recognized. Subsequent mid-flow packets received by the service engine are forwarded to the recipient service engine providing the success indicator.

A success rate associated with success indicators received by the service engine from the recipient service engine(s) is determined, at 304. The success rate is the number of success indicators received for a time interval. In some embodiments, the success rate is a real time success rate. In such embodiments, the success indicators are counted and the interval determined contemporaneously as success indicators are received. In other embodiments, the success rate is a total number of success indicators received over a specified time interval.

The success rate is compared with one or more thresholds, at 306. In some embodiments, the threshold is expressed as a fraction of the rate limit or other relevant parameter. In other embodiments, the threshold is a fixed number. Depending upon the comparison in 306, the rate limit is updated, at 308. For example, in some embodiments, if the success rate exceeds a first threshold, which indicates that the mid-flow packets are less likely to be attack packets, then the rate limit is increased. In other embodiments, if the success rate meets or exceeds the first threshold, the rate limit is increased. If the success rate is at or below a second threshold, the rate limit is decreased. In some embodiments, the rate limit has a minimum value and/or a maximum value beyond which the rate limit is unchanged. In such embodiments, once the rate limit has reached the maximum value, no further increases are made at 308 even if the success rate exceeds the first threshold. Similarly, once the rate limit has reached the minimum value, no further decreases are made at 308 even if the success rate is below the second threshold.

In some embodiments, the rate limit is increased in real time at 308. Thus, the rate limit is increased in response to the real time success rate meeting or exceeding the threshold. In other embodiments, the rate limit is increased at 308 only if the success rate meets or exceeds the threshold after the expiration of a time interval that has been specified. In some embodiments, the rate limit is decreased at 308 only after the expiration of the time interval. In such embodiments, the success rate being determined to be less than the second threshold during the time interval does not result in a decrease of the rate limit. The time interval is greater than the expected round trip time for a flow probe to reach recipient service engine(s) and a response return to the service engine from the recipient service engine. For example, the time interval may be set at a fixed value (e.g. 10) multiplied by the expected round trip time. In other embodiments, the rate limit is dynamically decreased. For example, if the real time success rate is less than the second threshold by at least a particular amount (e.g. less than a third threshold that is less than the second threshold) then the rate limit may be decreased.

Using method 300, the rate limit for flow probes is dynamically updated. As a result, the maximum rate at which flow probes may be sent by a service engine (i.e. the rate limit) is increased or decreased based upon the success rate. In some embodiments, the rate limit is increased in response to a sufficiently high number of success indicators signifying that another service engine recognizes the flow. Thus, the rate limit is increased in situations in which the mid-flow packet for an unrecognized flow is likely to correspond to normal operation of the system. As a result, connection drops and other undesirable behavior may be reduced or eliminated. The rate limit is decreased if a sufficiently low number of success indicators suggest that other service engines do not recognize the flow. Thus, the rate limit is decreased in situations in which the mid-flow packet for an unrecognized flow is more likely to represent an attack. The system may thus be protected against unwanted intrusions. Consequently, performance and security of the system may be improved.

Figure 4:
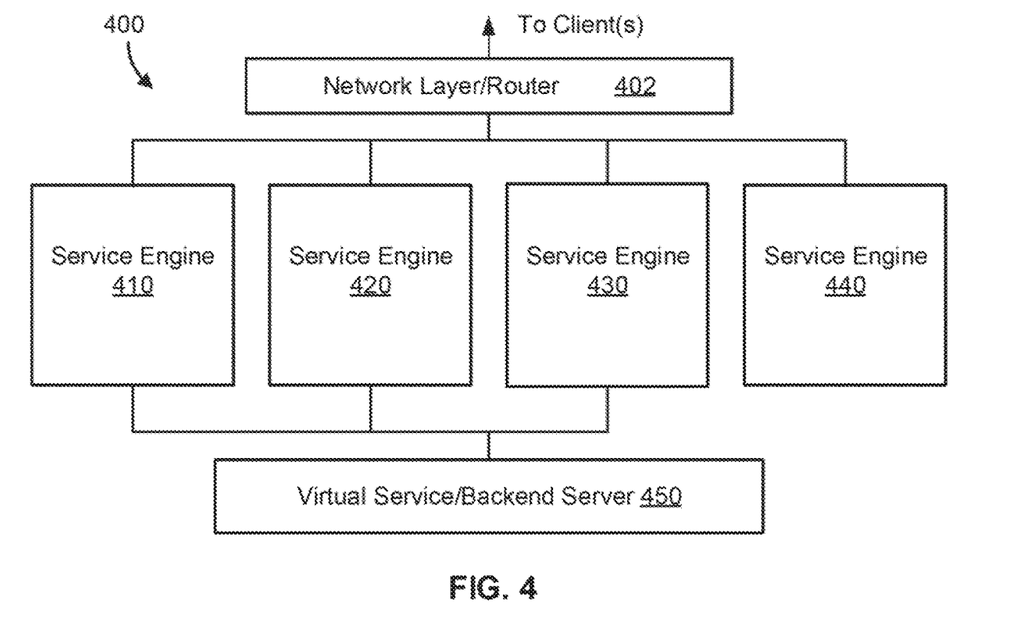
FIG. 4 is a block diagram illustrating an embodiment of a portion of a distributed network service platform that provides adaptive rate limiting of flow probes.

For example, FIG. 4 depicts an exemplary embodiment of a portion of a distributed service system 400 that utilizes a mechanism for adaptively rate limiting flow probes. The system 400 is analogous to the system 250 depicted in FIG. 2, and can be implemented using virtual machines as well as discrete physical machines. Referring back to FIG. 4, system 400 includes network layer 402, service engines 410, 420, 430 and 440 and virtual service 450. Although described as a virtual service 450, may be a virtual or physical component. Network layer 402 may include components such as routers used in distributing packets between service engines 410, 420, 430 and 440. Although four service engines 410, 420, 430 and 440 are shown, only services engines 410, 420 and 430 are part of a scale out set for virtual service 450. Service engines 410, 420, 430 and 440 can be load balancers and/or perform other functions such as firewall services. Virtual service 450 may be a login server, a credit card processing server, a database server, a back end server and/or other types of server.

Because service engines 410, 420 and 430 are part of the scale out set for virtual service 450, service engines 410, 420 and 430 have established connections with clients (not shown) of virtual service 450. Thus, each service engine 410, 420 and 430 manages one or more flows recognized by service engine 410, 420 and 430, respectively, for virtual service 450. In some embodiments, service engines 410, 420 and 430 maintain the identities of other service engines in the scale out set (e.g., by using a list, a table, or the like). For example, service engine 410 is aware that service engines 420 and 430 are also part of the scale out set for virtual service 450. However, service engines 410, 420 and 430 do not include data related to flows managed by other service engines. Thus, each service engine 410, 420 and 430 only have information related to flows managed by that service engine 410, 420 and 430, respectively.

Distributed service system 400 utilizes process 300 of FIG. 3. Consequently, service engines 410, 420 and 430 adaptively update the rate limit for flow probes. For example, service engines 410, 420 and 430 manage first, second and third flows, respectively, for virtual service 450.

Suppose that the first flow for service engine 410 is interrupted, for example due to a reset of a portion of network layer 402. Consequently, network layer 402 begins routing mid-flow packets for the first flow to a different service engine that is part of the scale out set. In this example, network layer routes mid-flow packets for the first flow to service engine 420. Because service engine 420 only recognizes the second flow (its own flow), service engine 420 does not recognize the first flow to which the mid-flow packet belongs. As a result, service engine 420 generates and sends flow probes at 302. In some embodiments, service engine 420 only sends flow probes to service engines 410 and 430 that are part of the scale out set for virtual service 450. In other embodiments, service engine 420 sends flow probes to service engines 410, 430 and 440, where service engines 410 and 430 are in the same scale out set for virtual service 450 but service engine 440 is for a different virtual service (not shown). In general, multiple flow probes are sent to each service engine in a time interval.

Service engine 410 recognizes the first flow and responds to the flow probe(s) by sending success indicator(s) to service engine 420. In this example, a response constitutes a success indicator. Thus, service engine 410 sends response(s) to the flow probe(s) to service engine 420. Because service engine 430 does not recognize the first flow, service engine 430 does not respond to the flow probes. Service engine 420 receives the responses from service engine 410 and determines a success rate at 304. Service engine 420 compares the success rate to the appropriate threshold(s), at 306. The rate limit can be updated by service engine 420 at 308. Because service engine 410 recognized the first flow and provided a success indicator to service engine 420, the success rate may exceed the threshold. Service engine 420 then raises the rate limit at 308. Thus, the rate limit is adjusted based upon the success rate of the flow probes sent by service engine 420.

Because service engine 410 recognized the first flow, service engine 420 now recognizes the first flow as corresponding to service engine 410. A binding is created between service engine 420 and service engine 410. The binding maps the destination of packets received by service engine 420 via the connection for the first flow to service engine 410. In some embodiments, this is accomplished via packet encapsulation. In such embodiments, service engine 420 adds to the header of mid-flow packets information identifying service engine 410 as the destination and service engine 420 as the source of the mid-flow packets. Packets for the first flow from the client are then provided from network layer 402 to service engine 420 and then forwarded from service engine 420 to service engine 410. Service engine 410 then utilizes virtual service 450 to service the flow. Packets to the client are provided directly from service engine 410 to network layer 402 and then to the client. In other embodiments, packets to the client are provided from service engine 410 to service engine 420 and from service engine 420 to network layer 402. Network layer 402 may communicate with the appropriate client (not shown in FIG. 4) via a network (not shown in FIG. 4). Because mid-flow packets for the first flow are now sent to the appropriate service engine 410, such mid-flow packets received at service engine 420 do not result in the corresponding connection being dropped. Thus, performance may be improved.

For example, suppose the flows managed by service engines 410, 420 and 430 for virtual service 450 are Flow A, Flow B, Flow C, Flow D, Flow E, Flow F and Flow G. Although identified as Flow A, Flow B, Flow C, Flow D, Flow E, Flow F and Flow G in this example, these flows correspond to particular connections with certain clients (not shown) and may actually be recognized by the IP addresses and port numbers or other mechanism for identification. Further, each service engine 410, 420, 430 and 440 utilizes a rate limit of Z probes/second for sending out flow probes. The distribution of flows is initially as follows:

| Service Engine | Flow Identifier | Flow Identifier | Flow Identifier | Rate Limit |
| --- | --- | --- | --- | --- |
| Service Engine 410 | Flow A | Flow B | Flow C | Z probes/sec |
| Service Engine 420 | Flow D | Flow E | | Z probes/sec |
| Service Engine 430 | Flow F | | | Z probes/sec |
| Service Engine 440 | Flow G | | | Z probes/sec |

Thus, Flow A, Flow B, Flow C, Flow D, Flow E and Flow F are part of the flows managed by scale out set (service engines 410, 420 and 430) for virtual service 450. Service engine 440 manages Flow G and is not part of the scale out set for virtual service 450. Suppose router 402 is reset, losing the addressing information for service engine 410. Consequently, Flow A, Flow B and Flow C are redistributed. Because the loads may be unbalanced, Flow D, Flow E and Flow F might be redistributed to other service engines. However, for the purposes of explanation, assume only Flow A, Flow B and Flow C are redistributed. Suppose after router 402 is reset, mid-flow packets from Flow A are sent to service engine 420, mid-flow packets from Flow B are sent to service engine 430, and mid-flow packets from Flow C are sent back to service engine 410. The resulting distribution of flows is:

| Service Engine | Flow Identifier | Flow Identifier | Flow Identifier | Rate Limit |
| --- | --- | --- | --- | --- |
| Service Engine 410 | Flow C | | | Z probes/sec |
| Service Engine 420 | Flow D | Flow E | Flow A* | Z probes/sec |
| Service Engine 430 | Flow F | Flow B* | | Z probes/sec |
| Service Engine 440 | Flow G | | | Z probes/sec |

In this situation, Flow A* is Flow A but has an asterisk (*) because the mid-stream packet(s) received by service engine 420 are from an unrecognized flow. Similarly, Flow B* is Flow B but has an asterisk (*) because the mid-stream packet(s) received by service engine 430 are from an unrecognized flow. Flow C happens to be routed back to service engine 410, and so is recognized despite the reset of router 402. Because service engines 420 and 430 receive mid-stream packets for unrecognized flows, service engines 420 and 430 send out flow probes at a rate not exceeding Z packets per second. The flow probes from service engines 420 and 430 include identifying information for Flow A and Flow B, respectively, and a request to respond if the flow is recognized. The flow probes in this example are sent to service engines in the scale out set for virtual service 450. Thus, service engine 420 sends flow probes related to Flow A to service engines 410 and 430. Service engine 430 sends flow probes related to Flow B to service engines 410 and 420. Service engine 410 recognizes Flow A and Flow B identified in the flow probes and provides success indicators to service engines 420 and 430, respectively. In some cases, the rate at success indicators are received may exceed a particular threshold. Suppose the rate at which the success indicators are received exceeds the threshold for service engine 420 but not for service engine 430. Thus, the rate limit for service engine 420 is increased to Z+ flow probes per second. In addition, because service engine 410 has responded that Flow A and Flow B are recognized, service engines 420 and 430 bind to service engine 410. Thus, service engine 420 will send packets for Flow A to service engine 410. Similarly, service engine 440 sends packets for Flow B on to service engine 410. Thus, the situation is shown as follows:

| Service Engine | Flow Identifier | Flow Identifier | Flow Identifier | Rate Limit |
|---|---|---|---|---|
| Service Engine 410 | Flow C | | | Z probes/sec |
| Service Engine 420 | Flow D | Flow E | Flow A <to SE 410> | Z + probes/sec |
| Service Engine 430 | Flow F | Flow B <to SE 410> | | Z probes/sec |
| Service Engine 440 | Flow G | | | Z probes/sec |

Here, <to SE 410> represents the binding for the flow. Flow A and Flow B are now recognized by service engines 420 and 430, respectively. Consequently, asterisks for these flows are no longer present.

Now suppose mid-flow packets for a new flow, Flow H, are present in system 400. Flow H is not based on an existing connection and is not due to rerouting of an existing flow. Thus, packets from Flow H may be part of an attack. Router 402 directs packets from Flow H to service engine 410. The resulting flows are:

| Service Engine | Flow Identifier | Flow Identifier | Flow Identifier | Rate Limit |
|---|---|---|---|---|
| Service Engine 410 | Flow C | Flow H* | | Z probes/sec |
| Service Engine 420 | Flow D | Flow E | Flow A <to SE 410> | Z + probes/sec |
| Service Engine 430 | Flow F | Flow B <to SE 410> | | Z probes/sec |
| Service Engine 440 | Flow G | | | Z probes/sec |

In this situation, Flow H* is Flow H but has an asterisk (*) because the mid-stream packet(s) received by service engine 410 are from an unrecognized flow. Because Flow H*/Flow H is not recognized by service engine 410, service engine 410 sends out flow probes identifying Flow H to service engines 420 and 430. However, Flow H* is not recognized by the remaining service engines 420 and 430. Consequently, the success rate indicators received by service engine 410 may be below a second threshold. As a result, the rate limit for packets sent by service engine 410 is reduced to Z− probes per second. The resulting flows are:

| Service Engine | Flow Identifier | Flow Identifier | Flow Identifier | Rate Limit |
|---|---|---|---|---|
| Service Engine 410 | Flow C | Flow H* | | Z − probes/sec |
| Service Engine 420 | Flow D | Flow E | Flow A <to SE 410> | Z + probes/sec |
| Service Engine 430 | Flow F | Flow B <to SE 410> | | Z probes/sec |
| Service Engine 440 | Flow G | | | Z probes/sec |

Eventually, the connection for Flow H* is dropped and the final flows are:

| Service Engine | Flow Identifier | Flow Identifier | Flow Identifier | Rate Limit |
|---|---|---|---|---|
| Service Engine 410 | Flow C | | | Z − probes/sec |
| Service Engine 420 | Flow D | Flow E | Flow A <to SE 410> | Z + probes/sec |
| Service Engine 430 | Flow F | Flow B <to SE 410> | | Z probes/sec |
| Service Engine 440 | Flow G | | | Z probes/sec |

Thus, system 400 can dynamically update the rate limit for flow probes. As a result, the maximum rate at which flow probes may be sent by a service engine 410, 420, 430 and/or 440 is increased or decreased based upon the success rate. Thus, the rate limit may be increased in situations in which the mid-flow packet for an unrecognized flow is likely to correspond to normal operation of the system. As a result, connection drops and other undesirable behavior may be reduced or eliminated. The rate limit may be decreased in situations in which the mid-flow packet for an unrecognized flow is more likely to be an attack. Performance and security of system 400 may thus be improved.

Figure 5:
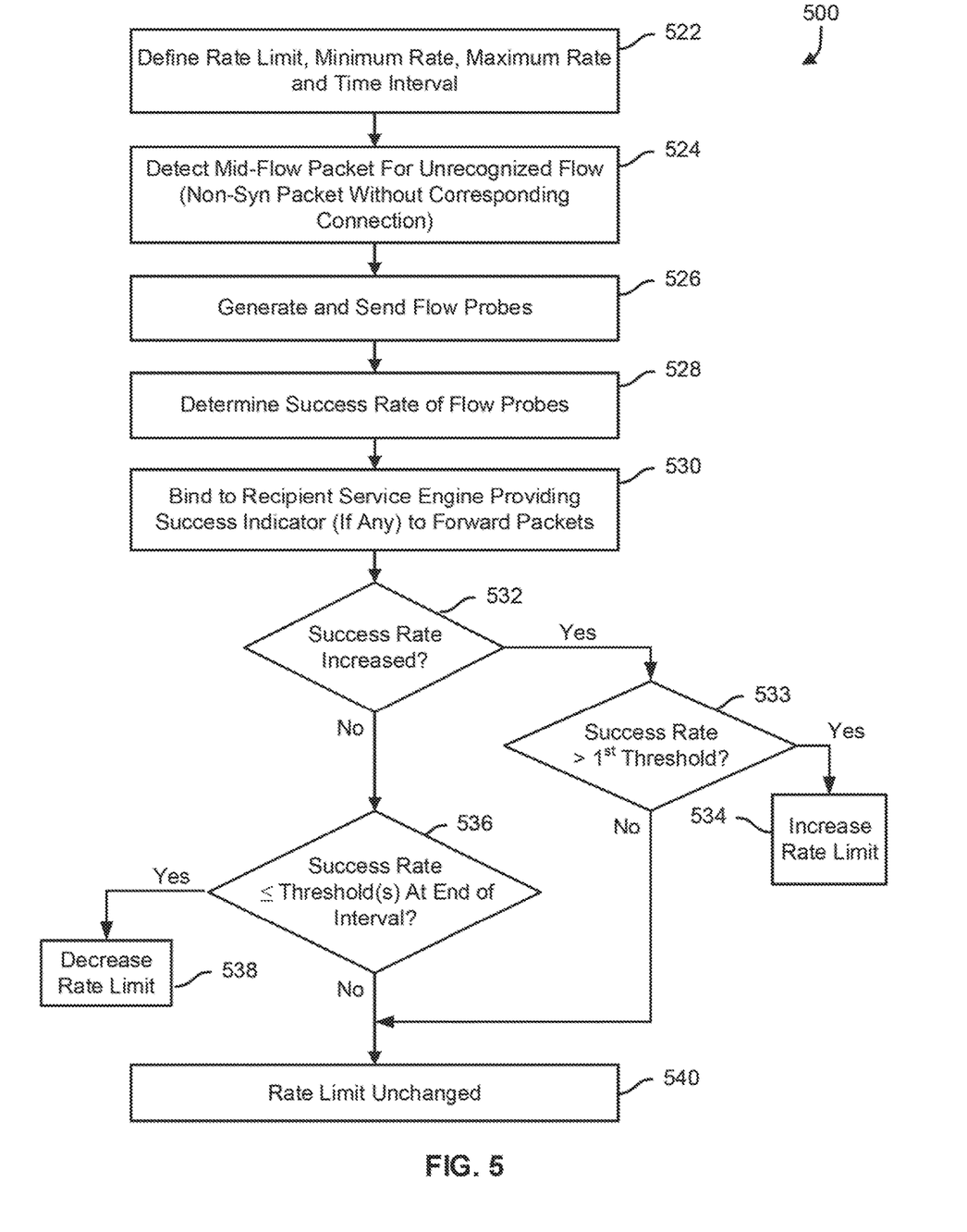
FIG. 5 is flow chart depicting another embodiment of a method for providing adaptive rate limiting for flow probes.

FIG. 5 depicts a flow chart of an embodiment of a process 500 for performing adaptive rate limiting of flow probes. Method 500 is described in the context of processes having a particular order. However, the processes may include sub-processes and may be performed in another order including but not limited to in parallel. Method 500 is also described in the context of particular thresholds and certain mechanisms for changing the rate limit. In other embodiments, other thresholds and/or other mechanisms for changing the rate limit may be used.

The rate limit, maximum rate, minimum rate and time interval are defined at 502. The flow probe rate limit is defined as a variable and may be in packets per second. The minimum and maximum rates are set values. The time interval may be defined in seconds. In some embodiments, the rate limit and time interval may not be defined together. For example, the rate limit may initially be desired to be 1000 packets per second, while the time interval may be two hundred and fifty milliseconds. In such cases, 522 includes adjusting the rate limit to the time interval. For the example above, the rate limit would be two hundred and fifty packets per time interval (two hundred and fifty milliseconds). In some embodiments, the minimum rate may be on the order of two hundred to three hundred packets per second. In some embodiments, the maximum mate may be on the order of one hundred thousand packets per second.

Mid-flow packets which are not for a recognized flow are detected by a service engine at 524. For example, non-SYN TCP packets that are for a TCP flow or connection that is not recognized by a service engine are detected by the service engine. Corresponding flow probes are generated and sent to other service engines in the scale out set, at 526.

The success rate for flow probes is determined, at 528. In some embodiments, a reply constitutes a success indicator. Thus, replies from recipient service engines are received at the service engine, detected and counted at 528. In addition, the total number of success indicators/replies received is tracked at 528. The number of success indicators received is incremented in real-time and cleared at the start of each time interval.

The service engine sending the flow probes binds to the recipient service engine providing the reply, at 530. Subsequent mid-flow packets for the flow are forwarded from the service engine to the recipient service engine providing the reply. Thus, the connection to the client providing the packets should not be dropped. Instead, the flow can be serviced.

It is determined whether the success rate has increased, at 532. Thus, at 532 it is determined whether the number of success indicators has been incremented. If so, the success rate is compared to a threshold, at 533. The success rate used at 533 is a real time success rate. In some embodiments, the threshold is a fraction of the current rate limit. The threshold may be set to be relatively low (e.g., less than 0.5) such that the system rapidly responds to increases in the success rate. For example, at 533 it is determined whether the current, real time success rate is greater than one-eighth of the current rate limit. If so, the rate limit is increased, at 534. For example, the rate limit may be doubled. In other embodiments, the rate limit may be incremented in another manner. However, at 534 the rate limit is not increased above the maximum rate limit. Thus, at 534, the rate limit is increased in response to a higher success rate. If the success rate does not exceed the first threshold, then the rate limit may be unchanged, at 540.

If the success rate has not increased, then after termination of the interval, it is determined whether the success rate is at or below one or more thresholds, at 536. In some embodiments, it is determined whether the success rate is zero at 536. A zero success rate implies that no other service engines recognize the flow. If no success indicators have been received, the rate limit is significantly decreased, at 538. For example, the rate limit may be halved. In some embodiments, multiple comparisons may be made at 536. For example, if the success rate is greater than zero, then the success rate is also compared with a fraction of the rate limit at 536. If the rate limit is less than a particular fraction of the rate limit, such as $\frac{1}{16}$ of the rate limit, then the rate limit is decreased less drastically at 538. For example, the rate limit may be multiplied by $\frac{3}{4}$. Other fractions or the rate limit may be used as the threshold and the rate limit may be decreased in another manner. At 538, therefore, the rate limit is decreased in response to a low success rate. If the success rate is not at or below the thresholds, then the rate limit is unchanged, at 540.

Using method 500, the rate limit for flow probes is dynamically updated. As a result, the maximum rate at which flow probes may be sent by a service engine is increased or decreased based upon the success rate. In some embodiments, the rate limit is increased for sufficiently large success rates. As a result, connection drops and other undesirable behavior may be reduced or eliminated. The rate limit is decreased for sufficiently low success rates. The system may thus be protected against unwanted intrusions. Consequently, performance and security of the system may be improved.

For example, system 200 may utilize method 500. Suppose service engines 214, 224 and 234 are part of the same scale out set. Thus, service engines 214, 224 and 234 serve first, second and third flows, respectively, for a virtual service. At 522, the rate limit, minimum rate, maximum rate and time interval may be defined as described above. In some embodiments, detection of a configuration event, such as an increase in the service engines in the scale out set, results in different values for the variables above. For example, detection of a configuration event by controller 290 may result in the rate limit being initially set at the maximum rate and method 500 being suspended for a particular time.

Suppose the third flow for service engine 234 is interrupted. Consequently, network layer 255 routes mid-flow packets for the third flow to service engine 214. Service engine 214 detects the mid-flow packets for an unrecognized flow (the third flow) at 524. Service engine 214 generates and sends flow probes to service engines 224 and 234 at 526. Service engine 234 recognizes the third flow and provides a response.

At 528, service engine 214 determines the success rate of the flow probes. Because service engine 234 recognized the third flow, the success rate determined at 528 is greater than zero and increasing. Further, service engine 214 binds to service engine 234. Consequently, subsequent mid-flow packets received are forwarded from service engine 214 to service engine 234. At 532, service engine 214 determines that the success rate has increased. Thus, it is determined at 533 whether the success rate exceeds a threshold, such as one-eighth of the rate limit. If so, the rate limit is increased at 534.

In another case, suppose that service engines 214, 224 and 234 are still part of the same scale out set. Service engines 214, 224 and 234 still serve first, second and third flows, respectively, for a virtual service. At 522, the rate limit, minimum rate, maximum rate and time interval may be defined as described above. Suppose that a mid-flow packet for another, fourth flow not serviced by any of the service engines 214, 224 and 234 in the scale out set is received at service engine 214. Network layer 255 routes mid-flow packets for the fourth flow to service engine 214. Service engine 214 detects the mid-flow packets for an unrecognized flow (the fourth flow) at 524. Service engine 214 generates and sends flow probes to service engines 224 and 234 at 526. However, none of the service engines recognizes the flow. Consequently, the success rate is determined to be zero at 528 and no binding is established at 530. At 532, the success rate is determined not to have increased. Thus, at 536 it is determined that the success rate is zero. Thus, the rate limit is halved, at 538. If instead the success rate had not increased but was nonzero and below another threshold, then the rate limit is decreased less dramatically at 538.

Consequently, the rate limit for flow probes is dynamically updated. The rate limit is increased or decreased based upon the success rate. As a result, connection drops and other undesirable behavior may be reduced or eliminated. The system may also be protected against unwanted intrusions. Performance and security of the system may be improved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
sending a plurality of flow probes from a first service engine to at least one other service engine, wherein:
the plurality of flow probes are sent at a rate not exceeding a rate limit;
a flow probe of the plurality of flow probes is generated in response to the first service engine receiving a mid-flow packet for a flow that is not recognized by the first service engine; and
a recipient service engine of the flow probe responds with a success indicator if the recipient service engine recognizes the flow;

determining a success rate associated with success indicators received from the at least one other service engine;

comparing the success rate with a first threshold; and adjusting the rate limit in response to a comparison result.

2. The method of claim 1, wherein the adjusting the rate limit in response to the comparison result comprises increasing the rate limit in response to the success rate exceeding or meeting a first threshold.

3. The method of claim 2, wherein the adjusting the rate limit further includes:

reducing the rate limit if the success rate is less than a second threshold.

4. The method of claim 2, wherein the adjusting the rate limit further includes:

reducing the rate limit after a predetermined interval if the success rate is less than a second threshold.

5. The method of claim 1, wherein the success rate corresponds to a number of success indicators received from the at least one other service engine in a time interval and the rate limit corresponds to a particular number of flow probes for the time interval.

6. The method of claim 5, wherein the success rate is a real time success rate.

7. The method of claim 1, further comprising:

initially setting a value of the rate limit in response to an event.

8. The method of claim 1, further comprising:

mapping the flow for the mid-flow packet from the first service engine to the recipient service engine providing the success indicator.

9. A system, comprising:

one or more processors configured to:

send a plurality of flow probes from a first service engine to at least one other service engine, wherein the plurality of flow probes are sent at a rate not exceeding a rate limit, a flow probe of the plurality of flow probes is generated in response to the first service engine receiving a mid-flow packet for a flow that is not recognized by the first service engine, and a recipient service engine of the flow probe responds with a success indicator if the recipient service engine recognizes the flow;

determine a success rate associated with success indicators received from the at least one other service engine;

compare the success rate with a first threshold; and adjust the rate limit in response to a comparison result; and one or more memories coupled to the one or more processors and configured to provide the one or more processors with instructions.

10. The system of claim 9, wherein to adjust the rate limit in response to the comparison result the processor is further configured to increase the rate limit in response to the success rate exceeding or meeting a first threshold.

11. The system of claim 10, wherein to adjust the rate limit the processor is further configured to:

reduce the rate limit if the success rate is less than a second threshold.

12. The system of claim 10, wherein to adjust the rate limit, the processor is further configured to:

reduce the rate limit after a predetermined interval if the success rate is less than a second threshold.

13. The system of claim 9, wherein the success rate corresponds to a number of success indicators received from the at least one other service engine in a time interval and the rate limit is a particular number over the time interval.

14. The system of claim 13, wherein the success rate is a real time success rate.

15. The system of claim 9, wherein the processor is further configured to:

initially set a value of the rate limit in response to an event.

16. The system of claim 9, wherein the processor is further configured to:

map the flow for the mid-flow packet from the first service engine to the recipient service engine providing the success indicator.

17. A computer program product, the computer program product being embodied in a non-transitory computer readable storage medium and comprising computer instructions for:

sending a plurality of flow probes from a first service engine to at least one other service engine, the plurality of flow probes being sent at a rate not exceeding a rate limit, a flow probe of the plurality of flow probes being generated in response to the first service engine receiving a mid-flow packet for a flow that is not recognized by the first service engine, a recipient service engine of the flow probe responding with a success indicator if the recipient service engine recognizes the flow;

determining a success rate associated with success indicators received from the at least one other service engine;

comparing the success rate with a first threshold; and increasing the rate limit in response to the success rate exceeding the first threshold.

18. The computer program product of claim 17, wherein the computer instructions for adjusting the rate limit in response to the comparison result comprises computer instructions for increasing the rate limit in response to the success rate exceeding or meeting a first threshold.

19. The computer program product of claim 18, wherein the computer instructions for adjusting the rate limit further include computer instructions for:

reducing the rate limit if the success rate is less than a second threshold.

20. The computer program product of claim 19, wherein the computer instructions for adjusting the rate limit further include computer instructions for:

reducing the rate limit after a predetermined interval if the success rate is less than the second threshold.

21. The computer program product of claim 19, wherein the success rate is a real time success rate.

22. The computer program product of claim 17, wherein the success rate corresponds to a number of success indicators received from the at least one other service engine in a time interval and the rate limit is a particular number over the time interval.

23. The computer program product of claim 17, wherein the computer instructions further include computer instructions for:

initially setting a value of the rate limit in response to an event.

* * * * *